United States Patent
Bao et al.

(10) Patent No.: US 12,018,654 B2
(45) Date of Patent: Jun. 25, 2024

(54) METHOD AND CONTROL DEVICE FOR ADJUSTING ACTIVE POWER OF WIND FARM AND CONTROLLER OF WIND FARM

(71) Applicant: BEIJING GOLDWIND SCIENCE & CREATION WINDPOWER EQUIPMENT CO., LTD., Beijing (CN)

(72) Inventors: Xianwen Bao, Beijing (CN); Yuan Qiao, Beijing (CN); Lianfu Yu, Beijing (CN); Meiling Zuo, Beijing (CN); Yanlu Liu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 343 days.

(21) Appl. No.: 17/429,003

(22) PCT Filed: Sep. 10, 2020

(86) PCT No.: PCT/CN2020/114510
§ 371 (c)(1),
(2) Date: Aug. 6, 2021

(87) PCT Pub. No.: WO2021/196525
PCT Pub. Date: Oct. 7, 2021

(65) Prior Publication Data
US 2022/0307474 A1    Sep. 29, 2022

(30) Foreign Application Priority Data

Mar. 31, 2020  (CN) ........................ 202010242215.X

(51) Int. Cl.
*F03D 7/04*    (2006.01)
*F03D 7/02*    (2006.01)

(52) U.S. Cl.
CPC .......... *F03D 7/048* (2013.01); *F03D 7/0224* (2013.01); *F03D 7/0284* (2013.01);
(Continued)

(58) Field of Classification Search
CPC ...... F03D 7/0224; F03D 7/0284; F03D 7/048; F05B 2270/1033; F05B 2270/328; F05B 2270/337
See application file for complete search history.

(56) References Cited

U.S. PATENT DOCUMENTS 3,001,714 A * 9/1961 Mckinley ............... G06G 7/635
705/412
3,151,250 A * 9/1964 Carlson .................... F02C 6/14
415/910

(Continued)

FOREIGN PATENT DOCUMENTS

CN    102709939 A    10/2012
CN    103606966 A    2/2014
(Continued)

OTHER PUBLICATIONS

International Search Report in corresponding International Application No. PCT/CN2020/114510 dated Jan. 4, 2021 (9 pages).
(Continued)

*Primary Examiner* — Tulsidas C Patel
*Assistant Examiner* — Thomas K Quigley
(74) *Attorney, Agent, or Firm* — Bayes PLLC

(57) ABSTRACT

A method and a control device for adjusting active power of a wind farm, and a controller of a wind farm are provided. The method includes: acquiring an active power increment to be adjusted in the wind farm; determining an active power adjustable amount of the wind farm based on active power adjustable amounts of wind turbines in the wind farm; and determining an active power adjustment amount of each of
(Continued)

the wind turbines based on the active power increment to be adjusted in the wind farm and the active power adjustable amount of the wind farm, to adjust active power of each of the wind turbines.

19 Claims, 4 Drawing Sheets

(52) U.S. Cl.
CPC . *F05B 2270/1033* (2013.01); *F05B 2270/328* (2013.01); *F05B 2270/337* (2013.01)

(56) References Cited

U.S. PATENT DOCUMENTS

| | | | | |
|---|---|---|---|---|
| 3,173,654 | A * | 3/1965 | Roe | F01K 13/025 290/40 R |
| 3,236,498 | A * | 2/1966 | Kerensky | F03B 15/06 415/164 |
| 7,372,173 | B2 * | 5/2008 | Lutze | H02J 3/381 290/55 |
| 8,606,418 | B1 * | 12/2013 | Myers | F03D 7/048 700/287 |
| 8,866,323 | B2 * | 10/2014 | Nielsen | H02J 3/381 290/44 |
| 8,866,334 | B2 * | 10/2014 | Donnelly | H02J 3/381 290/43 |
| 8,963,353 | B1 * | 2/2015 | Ekanayake | F03D 7/0284 290/43 |
| 8,994,200 | B2 * | 3/2015 | Thisted | F03D 9/255 290/55 |
| 9,189,755 | B2 * | 11/2015 | Krishna | G06Q 10/04 |
| 9,366,229 | B2 * | 6/2016 | Krueger | F03D 9/257 |
| 9,518,559 | B2 * | 12/2016 | Hiromasa | H02J 3/50 |
| 9,584,054 | B2 * | 2/2017 | Kosaka | F03D 7/048 |
| 9,835,136 | B2 * | 12/2017 | Haj-Maharsi | F03D 7/0292 |
| 9,983,241 | B2 * | 5/2018 | Nielsen | F03D 9/007 |
| 10,167,850 | B2 * | 1/2019 | Chen | F03D 7/048 |
| 10,605,229 | B2 * | 3/2020 | Zhang | H02P 9/04 |
| 10,968,891 | B2 * | 4/2021 | Gupta | H02J 3/381 |
| 11,078,887 | B2 * | 8/2021 | Grosseholz | F03D 7/048 |
| 2007/0047163 | A1 * | 3/2007 | Lutze | F03D 9/255 361/78 |
| 2011/0215640 | A1 * | 9/2011 | Donnelly | H02J 1/10 307/21 |
| 2011/0285130 | A1 * | 11/2011 | Thisted | F03D 7/0224 290/44 |
| 2012/0061963 | A1 * | 3/2012 | Thisted | F03D 9/255 700/297 |
| 2012/0078518 | A1 * | 3/2012 | Krishna | F03D 17/00 702/3 |
| 2012/0139247 | A1 * | 6/2012 | Krueger | F03D 7/0224 290/44 |
| 2012/0310426 | A1 * | 12/2012 | Tarnowski | H02P 9/105 700/287 |
| 2013/0221676 | A1 * | 8/2013 | Caldwell | F03D 15/00 290/55 |
| 2014/0001758 | A1 * | 1/2014 | Nielsen | H02J 3/381 290/44 |
| 2014/0103654 | A1 * | 4/2014 | Kosaka | F03D 7/028 290/44 |
| 2015/0076821 | A1 * | 3/2015 | Ekanayake | F03D 7/048 290/43 |
| 2015/0285220 | A1 * | 10/2015 | Hiromasa | F03D 7/04 290/44 |
| 2015/0292484 | A1 * | 10/2015 | Haj-Maharsi | F03D 15/10 290/44 |
| 2016/0084892 | A1 * | 3/2016 | Nielsen | F03D 17/00 702/61 |
| 2016/0273518 | A1 * | 9/2016 | Chen | F03D 7/045 |
| 2017/0244251 | A1 | 8/2017 | Nielsen et al. | |
| 2017/0298904 | A1 * | 10/2017 | Nielsen | F03D 7/0284 |
| 2017/0335824 | A1 * | 11/2017 | Gupta | H02J 3/0012 |
| 2018/0073486 | A1 * | 3/2018 | Zhang | F03D 7/048 |
| 2020/0263661 | A1 * | 8/2020 | Wu | H02J 3/48 |
| 2020/0392945 | A1 * | 12/2020 | Grosseholz | F03D 7/0284 |
| 2022/0220938 | A1 * | 7/2022 | Nayebi | F03D 7/048 |
| 2022/0349379 | A1 * | 11/2022 | Kidmose | F03D 7/0276 |

FOREIGN PATENT DOCUMENTS

| | | |
|---|---|---|
| CN | 107453411 A | 12/2017 |
| CN | 108521142 A | 9/2018 |
| CN | 109586319 A | 4/2019 |
| CN | 109973300 A | 7/2019 |
| CN | 110048440 A | 7/2019 |
| CN | 107565611 B | 8/2019 |
| CN | 110112791 A | 8/2019 |
| CN | 110311401 A | 10/2019 |
| CN | 110529336 A | 12/2019 |
| JP | 2017143706 A | 8/2017 |

OTHER PUBLICATIONS

European Search Report in corresponding European Application No. 20914766.9 dated Apr. 21, 2022 (8 pages).

* cited by examiner

METHOD AND CONTROL DEVICE FOR ADJUSTING ACTIVE POWER OF WIND FARM AND CONTROLLER OF WIND FARM

CROSS-REFERENCE TO RELATED APPLICATIONS

The present application is a national phase of International Application No. PCT/CN2020/114510, filed on Sep. 10, 2020, which claims priority to Chinese Patent Application No. 202010242215.X, filed on Mar. 31, 2020 with the China National Intellectual Property Administration. The entire contents of each of the above-identified applications are incorporated herein by reference.

TECHNICAL FIELD

The present disclosure relates to the technical field of wind power, and in particular o a method and a control device for adjusting active power of a wind farm, and a controller of a. wind farm.

BACKGROUND

With the continuous increase in permeability of a. new energy wind turbine, safety and stability of the wind turbine in a power grid with high permeability have attracted widespread attention.

In actual operation of the power grid, a small component with a small change and a short change period may exist in a frequency of the power grid if power consumption does not match power supply. For such frequency disturbance, a modulation system of the wind turbine automatically adjusts to compensate for a load for the power grid. A process of correcting a fluctuation in the frequency of the power grid is referred to a.s primary frequency modulation of the wind turbine.

The primary frequency modulation of the wind farm is used for adjusting characteristics of active power outputted by the wind farm, so as to provide fast and accurate active power support for the wind farm after frequency disturbance of the power grid system, thereby meeting requirements of safe operation of the power grid. The primary frequency modulation is of great significance to increase the permeability of a new energy wind farm and ensure stable operation of the power grid system.

Therefore, it is crucial to adjust the active power of the wind farm to effectively meet adjustment requirements.

SUMMARY

A method and a control device for adjusting active power of a wind farm, and a controller of a wind farm are provided according to exemplary embodiments of the present disclosure, to adjust the active power of the wind farm so as to effectively meet adjustment requirements, A method for adjusting active power of a wind farm is provided according to an exemplary embodiment of the present disclosure. The method includes: acquiring an active power increment to be adjusted in the wind farm; determining an active power adjustable amount of the wind farm based on active power adjustable amounts of wind turbines in the wind farm; and determining an active power adjustment amount of each of the wind turbines based on the active power increment to be adjusted in the wind farm and the active power adjustable amount of the wind farm, to adjust active power of each of the wind turbines. The active power adjustable amount of the wind turbine includes at least one of the following: a pitch increasable active power amount indicating an amount of the active power that is increasable by pitch activity, a pitch diminishable active power amount indicating an amount of the active power that is diminishable by pitch activity, a rotor kinetic energy increasable active power amount indicating an amount of the active power that is increasable by changing rotor kinetic energy, and a brake resistor diminishable active power amount indicating an amount of the active power that is diminishable by brake resistor.

A control device for adjusting active power of a wind farm is provided according to another exemplary embodiment of the present disclosure. The control device includes an increment acquisition unit, an adjustable amount determination unit, and an adjustment amount determination unit. The increment acquisition unit is configured to acquire an active power increment to be adjusted in the wind farm. The adjustable amount determination unit is configured to determine an active power adjustable amount of the wind farm based on active power adjustable amounts of wind turbines in the wind farm. The adjustment amount determination unit is configured to determine an active power adjustment amount of each of the wind turbines based on the active power increment to be adjusted in the wind farm and the active power adjustable amount of the wind farm, so as to adjust active power of each of the wind turbines. The active power adjustable amount of the wind turbine includes at least one of the following: a pitch increasable active power amount indicating an amount of the active power that is increasable by pitch activity, a pitch diminishable active power amount indicating an amount of the active power that is diminishable by pitch activity, a rotor kinetic energy increasable active power amount indicating an amount of the active power that is increasable by changing rotor kinetic energy, and a brake resistor diminishable active power amount indicating an amount of the active power that is diminishable by brake resistor.

A computer-readable storage medium storing a computer program is provided according to another exemplary embodiment of the present disclosure. The computer program, when executed by a processor, implements the above method for adjusting active power of a wind farm.

A controller of a wind farm is provided according to another exemplary embodiment of the present disclosure. The controller includes a processor and a memory. The memory stores a computer program. The computer program, when executed by a processor, implements the above method for adjusting active power of a wind farm.

The method and control device for adjusting active power of a wind farm, and the controller of a wind farm according to the exemplary embodiments of the present disclosure is applicable to adjustment of the active power of the wind farm in various scenarios (controlling the wind farm increase or decrease its active output), and can effectively meet adjustment requirements of fast adjustment speed, small impact on a load of a wind turbine, and flexible adjustment.

Other aspects and/or advantages of the general concept of the present disclosure are partially described below. Some of the other aspects and/or advantages of the general concept of the present disclosure can be dear through the description, or may be learned through the implementation of the general concept of the present disclosure.

BRIEF DESCRIPTION OF THE DRAWINGS

The above and other objects and features of exemplary embodiments of the present disclosure become clearer through the following description in conjunction with the accompanying drawings that exemplarily show the embodiments. In the drawings.

DETAILED DESCRIPTION OF EMBODIMENTS

Figure 1:
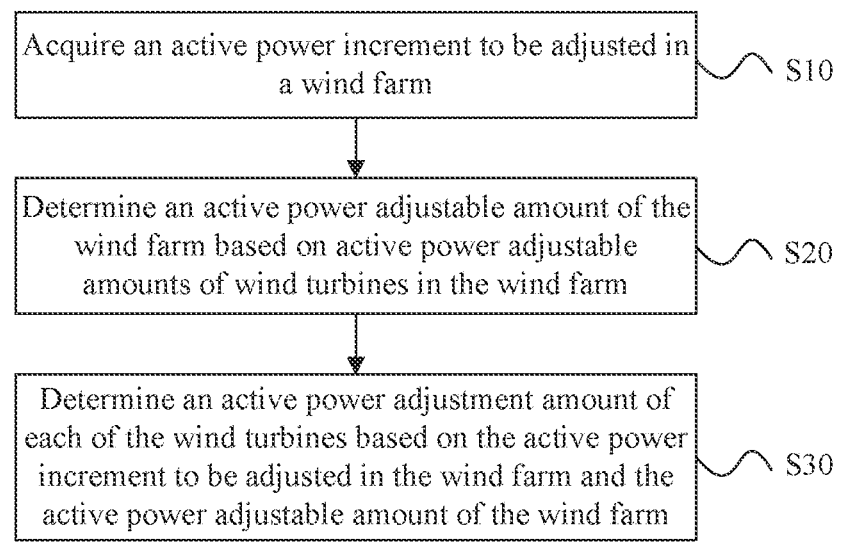
FIG. 1 is a flowchart of a method for adjusting active power of a wind farm according to an exemplary embodiment of the present disclosure.

Reference is made in detail to embodiments of the present disclosure, and examples of the embodiments are shown in the accompanying drawings. In the drawings, the same reference numerals always refer to the same components. The embodiments are described below by referring to the drawings so as to explain the present disclosure.

FIG. 1 is a flowchart of a method for adjusting active power of a wind farm according to an exemplary embodiment of the present disclosure.

Referring to FIG. 1, in step S10, an active power increment to be adjusted in the wind farm is acquired.

It should be understood that the active power increment to be adjusted in the wind farm may a positive amount (that is, an amount of the active power that needs to be increased in the wind farm) or a negative amount (that is, an amount of the active power that needs to be decreased in the wind farm).

In an example, the acquired active power increment to be adjusted in the wind farm may be an active power increment to be adjusted in the wind farm in one of the following cases: a case that the wind farm performs primary frequency modulation, a case that the wind farm performs secondary frequency modulation, and a case that at least one of the wind farm and a power grid connected to the wind farm has a fault. Alternatively, the acquired active power increment of the wind farm may he an active power increment to be adjusted in the wind farm in another case that the active power of the wind farm is required to be adjusted. That is, the method for adjusting active power of a wind farm according to the exemplary embodiment of the present disclosure is applicable to various cases for adjusting active power, such as a case of primary frequency modulation, a case of secondary frequency modulation and a case that at least one of the wind farm and the power grid connected to the wind farm has a fault (for example, a short-circuit fault or a fault in a circuit breaker).

For example, when determining that the ind farm performs the primary frequency modulation, the active power increment to be adjusted in the wind farm for this primary frequency modulation may be determined. An example of a method for acquiring an active power increment to be adjusted in the wind farm when the wind farm performing primary frequency modulation will be described in detail below with reference to FIG. 4.

In step S20, an active power adjustable amount of the wind farm is determined based on active power adjustable amounts of wind turbines in the wind farm, Here, the active power adjustable amount (that is, adjustable standby active power amount) of the wind turbine includes at least one of the following: a pitch increasable active power amount indicating an amount of the active power that is increasable by pitch activity, a pitch diminishable active power amount indicating an amount of the active power that is diminishable by pitch activity, a rotor kinetic energy increasable active power amount indicating an amount of the active power that is increasable by changing rotor kinetic energy, and a brake resistor diminishable active power amount indicating an amount of the active power that is diminishable by brake resistor.

In the wind turbine, a brake resistor of a converter is mainly configured to, in a period of low voltage ride through, convert the active power at the wind turbine side into heat energy, to quickly consume the active power at the wind turbine side, so as to help the wind turbine to achieve low voltage ride through.

It should be understood that the pitch increasable active power amount, the pitch diminishable active power amount, the rotor kinetic energy increasable active power amount and the brake resistor diminishable active power amount of the wind turbine may be determined based on appropriate operation parameters of the wind turbine in appropriate manners, which are not limited herein.

In a preferred embodiment, for each of the wind turbines, the pitch increasable active power amount and the rotor kinetic energy increasable active power amount of the wind turbine may be determined based on at least one of the following parameters of the wind turbine: current actual power, minimum power, rated power, minimum power capable of having rotor kinetic energy, current maximum theoretical power, a current actual pitch angle, and a minimum pitch angle. An example of a method for determining the pitch increasable active power amount and the rotor kinetic energy increasable active power amount of the wind turbine will be described in detail below with reference to FIG. 2.

The minimum power of the wind turbine may be defined as follows. In a case that the wind turbine decreases power in a manner of pitch, the wind turbine stops operating if the power of the wind turbine is lower than the minimum power. For example, the minimum power of the wind turbine may be 10% of the rated power of the wind turbine.

The minimum power capable of having rotor kinetic energy of he wind turbine may be minimum power required by the wind turbine to start a rotor kinetic energy function. For example, the minimum power capable of having rotor kinetic energy of the wind turbine may be 20% of the rated power of the wind turbine.

The current maximum theoretical power of the wind turbine may be maximum power that the wind turbine can theoretically achieve under a current wind speed.

In another preferred embodiment, for each of the wind turbines, a pitch diminishable active power amount and a brake resistor diminishable active power amount of the wind turbine may be determined based on at least one of the following parameters of the wind turbine: current actual power, minimum power, and brake resistor diminishable power capacity. An example of a method for determining the pitch diminishable active power amount and the brake resistor diminishable active power amount of the wind turbine will be described in detail below with reference to FIG. 3.

In an example, the brake resistor diminishable power capacity may be obtained from a converter. The brake resistor diminishable power capacity may be determined based on duration and diminishable power of the brake resistor per unit time.

In an example, step S20 may include the following steps of: determining a pitch increasable active power amount and a rotor kinetic energy increasable active power amount of each of the wind turbines: determining a pitch increasable active power amount of the wind farm based on the pitch increasable active power amount of each of the wind turbines; and determining a rotor kinetic energy increasable active power amount of the wind farm based on the rotor kinetic energy increasable active power amount of each of the wind turbines.

In an example, a sum of the pitch increasable active power amount of each of the wind turbines may be determined as the pitch increasable active power amount of the wind farm. A sum of the rotor kinetic energy increasable active power amount of each of the wind turbines may be determined as the rotor kinetic energy increasable active power amount of the wind farm. In addition, a sum of the rotor kinetic energy increasable active power amount of the wind farm and the pitch increasable active power amount of the wind farm may be determined as an increasable active power amount of the wind farm.

In an example, step S20 may include the following steps of: determining a pitch diminishable active power amount and a brake resistor diminishable active power amount of each of the wind turbines; determining a pitch diminishable active grower amount of the wind farm based on the pitch diminishable active power amount of each of the wind turbines; and determining a brake resistor diminishable active power amount of the wind farm based on the brake resistor diminishable active power amount of each of the wind turbines.

In an example, a sum of the pitch diminishable active power amount of each of wind turbines may be determined as the pitch diminishable active power amount of the wind farm, A sum of the brake resistor diminishable active power amount of each of the wind turbines may be determined as the brake resistor diminishable active power amount of the wind farm.

In step S30, an active power adjustment amount of each of the wind turbines is determined based on the active power increment to be adjusted in the wind farm and the active power adjustable amount of the wind farm, so as to adjust active power of each of the wind turbines.

Here, the active power adjustment amount (that is, active power change amount) of each of the wind turbines is an amount of the active power to be adjusted by each of the wind turbines, In an embodiment, in a case that the active power increment to be adjusted in the wind farm is greater than 0, it may be determined an amount of the active power of the wind turbine to be increased by pitch activity and/or an amount of the active power of the wind turbine to be increased by changing the rotor kinetic energy.

In an example, in a case that the active power increment to be adjusted in the wind farm is greater than 0 and not greater than the pitch increasable active power amount of the wind farm, the active power may be increased by pitch activity of the wind turbine preferentially.

Specifically, in the case that the active power increment to he adjusted in the wind farm is greater than 0 and not greater than the pitch increasable active power amount of the wind farm, the amount of the active power of each of the wind turbines to be increased by pitch activity may be determined based on the active power increment to be adjusted in the wind farm and the pitch increasable active power amount of the wind farm.

Further, in an example, in the case that the active power increment o be adjusted in the wind farm is greater than 0 and not greater than the pitch increasable active power amount of the wind farm, the amount of the active power of each of the wind turbines to be increased by pitch activity may be determined to be a product of the pitch increasable active power amount of the wind turbine and a first pitch ratio coefficient. Here, the first pitch ratio coefficient $K_{pitch1}$ is a ratio of an absolute value fabs (DeltPwf_dernand) of the active power increment to be adjusted in the wind farm to the pitch increasable active power amount DeltPwf_pitchup of the wind farm, that is, $$K_{pitch1} = \frac{fabs(\text{DeltPwf\_demand})}{\text{DeltPwf\_pitchup}}.$$

In an example, in a case that the active power increment of the wind farm is greater than the pitch increasable active power amount of the wind farm, the active power may be increased based on the pitch activity and the rotor kinetic energy of the wind turbine. Specifically, in the case that the active power increment to be adjusted in the wind farm is greater than the pitch increasable active power amount of the wind farm, the amount of the active power of each of the wind turbines to be increased by pitch activity and an amount of the active power of each of the wind turbines to be increased by changing the rotor kinetic energy may be determined based on the active power increment to be adjusted in the wind farm, the pitch increasable active power amount of the wind farm, and the rotor kinetic energy increasable active power amount of the wind farm.

Further, in an example, in the case that the active power increment to be adjusted in the wind farm is greater than the pitch increasable active power amount of the wind farm, the amount of the active power of each of the wind turbines to be increased by pitch activity may be determined to be a pitch increasable active power amount of the wind turbine (that is, the first pitch ratio coefficient is set to be 1), and the amount of the active power of each of the wind turbines to be increased by changing the rotor kinetic energy may be determined to be a product of a rotor kinetic energy increasable active power amount of the wind turbine and a rotor kinetic energy ratio coefficient. Here, the rotor kinetic energy ratio coefficient $K_{RKE}$ is a ratio of a difference between an absolute value fabs (DeltPwf_demand) of the active power increment to be adjusted in the wind farm and the pitch increasable active power amount DeltPwf_pitchup of the wind farm to the rotor kinetic energy increasable active power amount DeltPwf_RKEup of the wind farm, that is, $$K_{RKE} = \frac{fabs(\text{DeltPwf\_demand}) - \text{DeltPwf\_pitchup}}{\text{DeltPwf\_RKEup}}.$$

In a case that the ratio of the difference between the absolute value of the active power increment to be adjusted in the wind farm and the pitch increasable active power amount of the wind farm to the rotor kinetic energy increasable active power amount of the wind farm is greater than 1, the rotor kinetic energy ratio coefficient is set to 1.

In another embodiment, in a case that the active power increment o be adjusted in the wind farm is less than 0, for each of the wind turbines, it may be determined an amount of the active power of the wind turbine to be decreased by pitch activity and brake resistor together and/or an amount of the active power of the wind turbine to be decreased by pitch activity only. In an example, the amount of the active power of the wind turbine to be decreased by pitch activity and brake resistor together may be an amount of the active power of the wind turbine to be decreased by pitch activity and brake resistor simultaneously.

In an example, in a case that the active power increment to be adjusted in the wind farm is less than 0 and an absolute value of the active power increment to be adjusted in the wind farm is not greater than the pitch diminishable active power amount of the wind farm, the active power may be decreased by pitch activity and brake resistor together preferably. Specifically, in a. case that the active power increment to be adjusted in the wind farm is less than 0 and an absolute value of the active power increment to be adjusted in the wind farm is not greater than the brake resistor diminishable active power amount of the wind farm, the amount of the active power of each of the wind turbines to be decreased by pitch activity and brake resistor together may be determined based on the active power increment to be adjusted in the wind farm and the brake resistor diminishable active power amount of the wind farm.

Further, in an example, in the case that the active power increment o be adjusted in the wind farm is less than 0 and an absolute value of the active power increment to be adjusted in the wind farm is not greater than the brake resistor diminishable active power amount of the wind farm, the amount of the active power of each of the wind turbines to be decreased by pitch activity and brake resistor together may be determined to be a product of a brake resistor diminishable active power amount of the wind turbine and a synergy ratio coefficient. Here, the synergy ratio coefficient $K_{pitch+res}$ is a ratio of the absolute value fabs (DeltPwf_demand) of the active power increment to be adjusted in the wind farm to the brake resistor diminishable active power amount DeltPwf_resdown of the wind farm, that is, $$K_{pitch+res} = \frac{fabs(\text{DeltPwf\_demand})}{\text{DeltPwf\_resdown}}.$$

In an example, in a case that the active power increment to be adjusted in the wind farm is less than 0 and an absolute value of the active power increment to be adjusted in the wind farm is greater than the pitch diminishable active power amount of the wind farm, and the pitch diminishable active power amount of the wind farm is greater than the brake resistor diminishable active power amount of the wind farm, the active power may be decreased by pitch activity and brake resistor together preferably, and then the remain active power to be decreased may be further decreased by pitch activity only. Specifically, in a case that the active power increment to be adjusted in the wind farm is less than 0 and an absolute value of the active power increment to be adjusted in the wind farm is greater than the brake resistor diminishable active power amount of the wind farm, and the pitch diminishable active power amount of the wind farm is greater than the brake resistor diminishable active power amount of the wind farm, the amount of the active power of each of the wind turbines to be decreased by pitch activity and brake resistor together and the amount of the active power of the wind turbine to be decreased by pitch activity only may be determined based on the active power increment to be adjusted in the wind farm, the pitch diminishable active power amount of the wind farm, and the brake resistor diminishable active power amount of the wind farm.

Further, in an example, in the case that, the active power increment to be adjusted in the wind farm is less than 0 and an absolute value of the active power increment to be adjusted in the wind farm is greater than the brake resistor diminishable active power amount of the wind farm, and the pitch diminishable active power amount of the wind farm is greater than the brake resistor diminishable active power amount of the wind farm, the amount of the active power of each of the wind turbines to be decreased by pitch activity and brake resistor together may be determined to be the brake resistor diminishable active power amount of the wind turbine (that is, the synergy ratio coefficient is set to 1), and the amount of the active power of each of the wind turbines to be decreased by pitch activity only may be determined to be a produce of a second pitch ratio coefficient and a difference between the pitch diminishable active power amount of the wind turbine and the brake resistor diminishable active power amount of the wind turbine. Here, the second pitch ratio coefficient $K_{pitch2}$ is a ratio of a first specific difference to a second specific difference. The first specific difference is a difference between the absolute value fabs (DeltPwf_demand) of the active power increment to be adjusted in the wind farm and the brake resistor diminishable active power amount DeltPwf_resdown of the wind farm. The second specific difference is a difference between the pitch diminishable active power amount DeltPwf_pitchdown of the wind farm and the brake resistor diminishable active power amount DeltPwf_resdown of the wind farm. That is, $$K_{pitch2} = \frac{fabs(\text{DeltPwf\_demand}) - \text{DeltPwf\_resdown}}{\text{DeltPwf\_pitchdown} - \text{DeltPwf\_resdown}}.$$

In a case that the ratio of the first specific difference to the second specific difference is greater than I, the second pitch ratio coefficient is set to 1.

It should be understood that the method for adjusting active power of a wind farm according to the exemplary embodiment of the present disclosure may be performed periodically (for example, according to a control cycle of a farm control system). Alternatively, the hod for adjusting active power of a wind farm according to the exemplary embodiment of the present disclosure may be performed aperiodically (for example, in response to a trigger condition).

In consideration of advantages and disadvantages of various methods for adjusting active power by a wind turbine, it is provided in this disclosure a method for adjusting active power of a wind farm quickly, flexibly and without affecting load safety of the wind turbine. For example, rotor kinetic energy control of a wind turbine has advantages of fast response speed, and disadvantages of its impact on load safety of the wind turbine, complex control strategy and limited amplitude for active power adjustment. Pitch control of a wind turbine has advantages of large adjustment amplitude of active power, and disadvantages of low power adjustment speed and partial impact on a load of the wind turbine.

In an example, the method for adjusting active power of a wind farm according to the exemplary embodiment of the present disclosure may further include the following steps of: for each of the wind turbines, adjusting the active power of the wind turbine to be increased or decreased based on the active power adjustment amount of the wind turbine, so as to adjust the active power of the wind farm. In an example, an active power control command may be sent to each of the wind turbines, so that the wind turbine adjusts its active power based on the active power control command. For example, an active power control command indicating an amount of the active power of the wind turbine to be increased by pitch activity and/or an amount of the active power of the wind turbine to be increased by changing the rotor kinetic energy may be sent to the wind turbine, to control the wind turbine to increase the active power. Alternatively, an active power control command indicating an amount of the active power of the wind turbine to be decreased by pitch activity and brake resistor together and/or an amount of the active power of the wind turbine to be decreased by pitch activity only may be sent to the wind turbine, to control the wind turbine to decrease the active power. For example, an active power control command indicating an active power required to be reached by e wind turbine may be sent to the wind turbine. In a case that the active power of the wind turbine is required to be increased, the active power required to be reached by the wind turbine may be a sum of current actual power of the wind turbine and the active power adjustment amount of the wind turbine. In a case that the active power of the wind turbine is required to be decreased, the active power required to be reached by the wind turbine may be a result obtained by subtracting the active power adjustment amount of the wind turbine from current actual power of the wind turbine.

addition, in an example, the method for adjusting active power of a wind farm according to the exemplary embodiment of the present disclosure may further include the following steps of: for each of the wind turbines, starting timekeeping from a time instant when increasing the active power of the wind turbine by changing the rotor kinetic energy, and controlling the wind turbine to stop adjusting its active power if duration of increasing the active power of the wind turbine by changing the rotor kinetic energy reaches a first preset time period. this time. The first preset time period may be set according to actual conditions and requirements. For example, the first preset time period may be set to 10s.

In addition, in an example, the method for adjusting active power of a wind farm according to the exemplary embodiment of the present disclosure may further include the following steps of: for each of the wind turbines, starting timekeeping from a time instant when decreasing the active power of the wind turbine by brake resistor, and controlling the wind turbine to stop adjusting its active power if duration of decreasing the active power of the wind turbine by brake resistor reaches a second preset time period this time. The second preset time period may be set according to actual conditions and requirements. For example, the second preset e period may be set to 10s.

Figure 2:
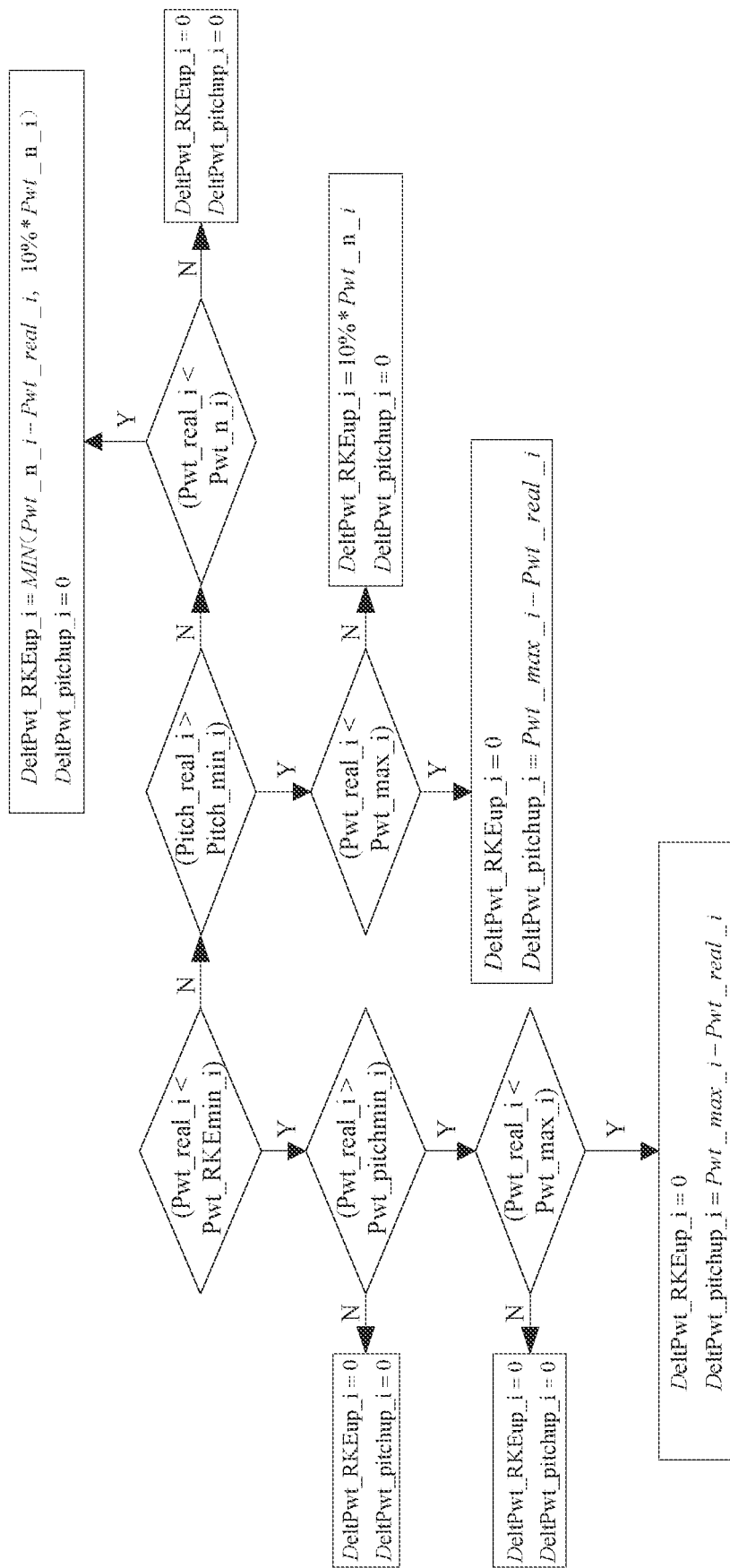
FIG. 2 is a flowchart of a method for determining a pitch increasable active power amount and a rotor kinetic energy increasable active power amount of a wind turbine according to an exemplary embodiment of the present disclosure.

FIG. 2 is a flowchart of a method for determining a pitch increasable active power amount and a rotor kinetic energy increasable active power amount of a wind turbine according to an exemplary embodiment of the present disclosure.

Referring to FIG. 2, for each of the wind turbines, in a case that current actual power $Pwt\_real\_i$ of the wind turbine is less than minimum power capable of having rotor kinetic energy $Pwt\_RKEmin\_i$ of the wind turbine and the current actual power $Pwt\_real\_i$ of the wind turbine is less than minimum power $Pwt\_pitchmin\_i$ of the wind turbine, both the pitch increasable active power amount $DeltPw\_pitchup\_i$ and the rotor kinetic energy increasable active power amount $DeltPwt\_RKEup\_i$ of the wind turbine are equal to 0.

For each of the wind turbines, in a case that the current actual power $Pwt\_real\_i$ of the wind turbine is less than the minimum power capable of having rotor kinetic energy $Pwt\_RKEmin\_i$ of the wind turbine and the current actual power $Pwt\_real\_i$ of the wind turbine is greater than minimum power $Pwt\_pitchmin\_i$ of the wind turbine and current maximum theoretical power $Pwt\_max\_i$ of the wind turbine, both the pitch increasable active power amount $DeltPwt\_pitchup\_i$ and the rotor kinetic energy increasable active power amount $DeltPwt\_RKEup\_i$ of the wind turbine are equal to 0.

For each of the wind turbines, in a case that the current actual power $Pwt\_real\_i$ of the wind turbine is less than minimum power capable of having rotor kinetic energy $Pwt\_RKE\_min\_1$ of the wind turbine and the current maximum theoretical power $Pwt\_max\_i$ of the wind turbine, and the current actual power $Pwt\_real\_i$ of the wind turbine is greater than the minimum power $Pwt\_pitchmnin\_i$ of the wind turbine, the rotor kinetic energy increasable active power amount $DeltPwt\_RKEup\_i$ of the wind turbine is equal to 0, and the pitch increasable active power amount $DeltPwt\_pitchup\_i$ of the wind turbine is equal to a difference between the current maximum theoretical power of the wind turbine and the current actual power of the wind turbine, that is, $DeltPwt\_pitchup\_i = Pwt\_max\_i - Pwt\_real\_i$.

For each of the wind turbines, in a case that the current actual power $Pwt\_real\_i$ of the wind turbine is greater than the minimum power capable of having rotor kinetic energy $Pwt\_RKEmin\_i$ of the wind turbine and less than the current maximum theoretical power $Pwt\_max\_i$ of the wind turbine, and a current actual pitch angle $Pitch\_real\_i$ of the wind turbine is greater than a minimum pitch angle $Pitch\_min\_i$ of the wind turbine, the rotor kinetic energy increasable active power amount $DeltPwt\_RKEup\_i$ of the wind turbine is equal to 0, and the pitch increasable active power amount $DeltPwt\_pitchup\_i$ of the wind turbine is equal to a difference between the current maximum theoretical power of the wind turbine and the current actual power of the wind turbine, that is, $DeltPwt\_pitchup\_i = Pwt\_max\_i - Pwt\_real\_i$.

For each of the wind turbines, in a case that the current actual power $Pwt\_real\_i$ of the wind turbine is greater than the minimum power capable of having rotor kinetic energy $Pwt\_RKEmin\_i$ of the wind turbine and the current maximum theoretical power $Pwt\_max\_i$ of the wind turbine, and a. current actual pitch angle Pitch real i of the wind turbine is greater than a minimum pitch angle $Pitch\_min\_i$ of the wind turbine, the rotor kinetic energy increasable active power amount $DeltPwt\_RKEup\_i$ of the wind turbine is equal to rated power of the wind turbine multiplied by a first preset ratio (that is, the first preset ratio *$Pwt\_n\_i$ and the first preset ratio may he set to 10% for example), and the pitch increasable active power amount $DeltPwt\_pitchup\_i$ of the wind turbine is equal to 0.

For each of the wind turbines, in a case that the current actual power $Pwt\_real\_i$ of the wind turbine is greater than the minimum power capable of having rotor kinetic energy $Pwt\_RKEmin\_i$ of the wind turbine and rated power $Pwt\_n\_i$ of the wind turbine, and a current actual pitch angle $Pitch\_real\_i$ of the wind turbine is less than a minimum pitch angle Pitch_min_i of the wind turbine, both the pitch increasable active power amount DeltPwt_pitchup_i and the rotor kinetic energy increasable active power amount DettPwt_RKEup_i of the wind turbine are equal to 0.

For each of the wind turbines, in a case that the current actual power Pwt_real_i of the wind turbine is greater than minimum power capable of having rotor kinetic energy Pwt_RKEmin_i of the wind turbine and less than the rated power Pwt_n_i of the wind turbine, and a current actual pitch angle Pitch_real_i of the wind turbine is less than a minimum pitch angle Pitch_min_i of the wind turbine, the rotor kinetic energy increasable active power amount DeltPwt_RKEup_i or the wind turbine is equal to a minimum one of the rated power of the wind turbine multiplied by the first preset ratio (that is, the first preset ratio *Pwt_n_i) and a difference between the rated power of the wind turbine and the current actual power of the wind turbine (that is, Pwt_n_i-Pwt_real_i), and the pitch increasable active power amount DeltPwt_pitchup_i of the wind turbine is equal to 0.

Figure 3:
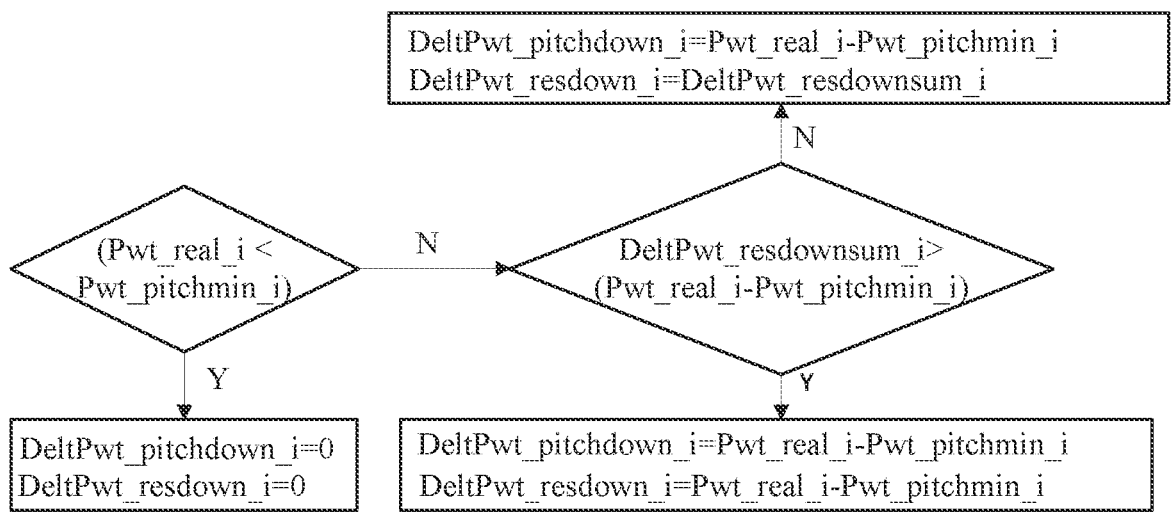
FIG. 3 is a flowchart of a method for determining a pitch diminishable active power amount and a brake resistor diminishable active power amount of a wind turbine according to an exemplary embodiment of the present disclosure.

FIG. 3 is a flowchart of a method for determining a pitch diminishable active power amount and a brake resistor diminishable active power amount according to an exemplary embodiment of the present disclosure.

Referring to FIG. 3, for each of the wind turbines, in a case that current actual power Pwt_real_i of the wind turbine is less than minimum power Pwt_pitchmin_i of the wind turbine, both the pitch diminishable active power amount DeitPwt_pitchdown_i and the brake resistor diminishable active power amount DeltPwt_resdown_i of the wind turbine are equal to 0.

For each of the wind turbines, in a case that current actual power Pwt_real_i of the wind turbine is greater than minimum power Pwt_pitchmin_i of the wind turbine, and a difference between the current actual power of the wind turbine and the minimum power of the wind turbine (that is, Pwt_real_i-Pwt_pitchmin_i) is greater than a brake resistor diminishable power capacity DeltPwt_resdownsum_i of the wind turbine, the pitch diminishable active power amount DeltPwt_pitchdown_i of the wind turbine is equal to the difference between the current actual power of the wind turbine and the minimum power of the wind turbine (that is, Pwt_real_i-Pwt_pitchmin_i), and the brake resistor diminishable active power amount DeltPwt_resdown_i of the wind turbine is equal to the brake resistor diminishable power capacity DeltPwt_resdownsum_i of the wind turbine.

For each of the wind turbines, in a case that current actual power Pwt_real_i of the wind turbine is greater than minimum power pwt_pitchmin_i of the wind turbine, and a difference between the current actual power of the wind turbine and the minimum power of the wind turbine (that is, Pwt_real_i-Pwt_pitchmin_i) is less than a brake resistor diminishable power capacity DeltPwt_resdownsum_i of the wind turbine, the pitch diminishable active power amount DeltPwt_pitchdown_i of the wind turbine is equal to the difference between the current actual power of the wind turbine and the minimum power of the wind turbine (that is, Pwt_real_i-Pwt_pitchmin_i), and the brake resistor diminishable active power amount DeltPwt_resdown_i of the wind turbine is equal to the difference between the current actual power of the wind turbine and the minimum power of the wind turbine (that is, Pwt_real_i-Pwt_pitchmin_i).

Figure 4:
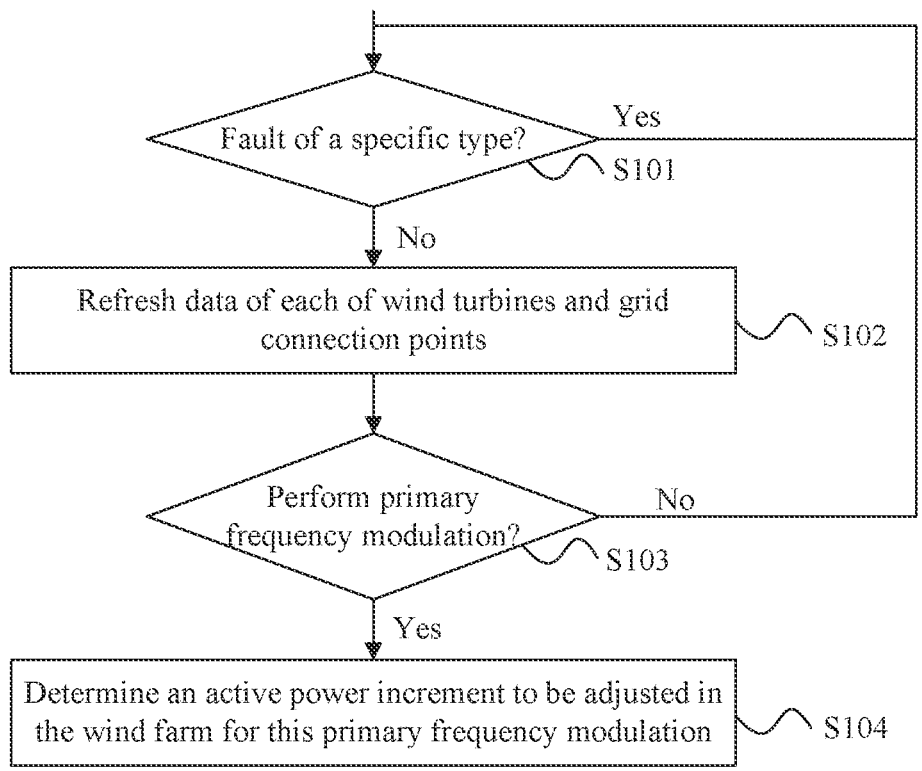
FIG. 4 is a flowchart of a method for acquiring an active power increment to be adjusted in the wind farm when the wind farm performs primary frequency modulation according to an exemplary embodiment of the present disclosure.

FIG. 4 is a flowchart of a method for acquiring an active power increment to be adjusted in the wind farm when performing primary frequency modulation according to an exemplary embodiment of the present disclosure.

Referring to FIG. 4, in step S101, it is determined whether at least one of the wind farm and a power grid connected to the wind farm has a fault of specific type.

In an example, it may be determined whether a fault of specific type exists based on refreshed fault information. For example, the fault information may include at least one of the following: overvoltage, undervoltage, overfrequency, underfrequency and low power of a grid connection point in the wind farm, and a hardware alarm of a farm control system (for example, an alarm issued when the power grid has a fault or output power of the wind farm is low).

If it is determined that there has no fault of the specific type in step S101, step S102 is performed. In step S102, data of each of wind turbines and grid connection points is refreshed. Otherwise, Return.

In an example, the refreshed data may include at least one of the following: a current terminal voltage of the wind turbine, current active power of the wind turbine, current reactive power of the wind turbine, a controllable flag bit of the wind turbine, an operation state of the wind turbine, and a primary frequency modulation command value of the wind turbine, a primary frequency modulation command feedback value of the wind turbine, an average wind speed of the wind turbine in 3 seconds, an instantaneous value of a pitch angle 1, an instantaneous value of a pitch angle 2, an instantaneous value of a pitch angle 3, instantaneous rotation speed rad/s of the wind turbine, torque setting, brake resistor consumable power of the wind turbine, a phase voltage of the grid connection point, a phase current of the grid connection point, active power of the grid connection point, reactive power of the grid connection point, a frequency of the grid connection point, and a power factor of the grid connection point In step S103, it is determined whether the wind farm performs primary frequency modulation based on the refreshed data of each of the wind turbines and the grid connection point.

In an example, in a case that the frequency of the grid connection point is not within a frequency dead range, and the active power of the wind farm is not less than 20% of the rated power of the wind farm, it is determined that the wind farm performs the primary frequency modulation. It should be understood that whether the wind farm performs primary frequency modulation may be determined in other manners.

If it is determined in step S103 that the wind farm performs the primary frequency modulation, step S104 is performed. In step S104, an active power increment to be adjusted in the wind farm for this primary frequency modulation is determined.

In an example, a demand value DeltP of active power increment may be calculated from an equation (1), and a demand value P of active power may be calculated from an equation (2).

$$DeltP = -P_n \cdot \frac{(f - f_d)}{f_N} \cdot \frac{1}{\delta\%} \quad (1)$$

$$P = P_0 - P_n \cdot \frac{(f - f_d)}{f_N} \cdot \frac{1}{\delta\%} \quad (2)$$

In the above equations (1) and (2), $f_d$ indicates a threshold of fast frequency response action, f indicates the frequency of the grid connection point, $P_n$ indicates the rated power of the wind farm, $\delta\%$ indicates a modulation proportion, $P_0$ indicates the current active power of the wind farm, and $f_N$ indicates a rated frequency of the grid. It should be understood that in case of over-frequency and in case of under-frequency, parameters in the equations may be set independently and may be adjusted online. For example, reference parameters are as follows: $f_d$ may be set to 50±0.1 Hz, and the modulation proportion δ% may be set to 2% to 3%.

Next, it may be determined whether the calculated demand value of active power increment is greater than a first preset threshold or less than a second preset threshold. In a case that the calculated demand value of active power increment is greater than the first preset threshold, the active power increment to be adjusted in the wind farm for this primary frequency modulation is determined as the first preset threshold. In a case that the calculated demand value of active power increment is less than the second preset threshold, the active power increment to be adjusted in the wind farm for this primary frequency modulation is determined as the second preset threshold. In a case that the calculated demand value of active power increment is less than or equal o the first preset threshold and greater than or equal to the second preset threshold, the active power increment to be adjusted in the wind farm for this primary frequency modulation is determined as the calculated demand value of active power increment. In an example, the first preset threshold may be 10% of the rated power of the wind farm, and the second preset threshold may be negative of the first preset threshold.

Figure 5:
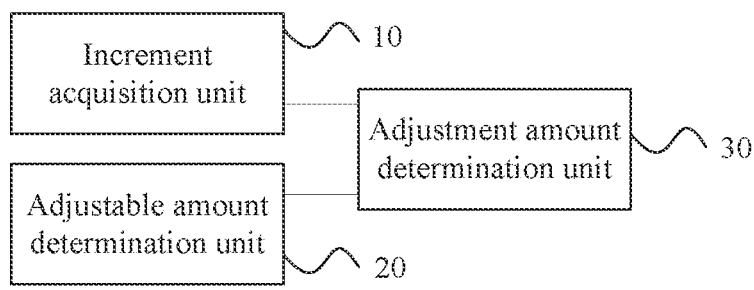
FIG. 5 is a structural block diagram of a control device for adjusting active power of a wind farm according to an exemplary embodiment of the present disclosure.

FIG. 5 is a structural block diagram of a control device for adjusting active power of a wind farm according to an exemplary embodiment of the present disclosure.

As shown in FIG. 5, the control device for adjusting active power of a wind farm according to the exemplary embodiment of the present disclosure includes an increment acquisition unit 10, an adjustable amount determination unit 20, and an adjustment amount determination unit 30.

The increment acquisition unit 10 is configured to acquire an active power increment to be adjusted in the wind farm.

In an example, the acquired active power increment to be adjusted in the wind farm may be an active power increment to be adjusted in the wind farm in one of the following cases: a case that the wind farm performs primary frequency modulation, a case that the wind farm performs secondary frequency modulation, and a case that at least one of the wind farm and a power grid connected to the wind farm has a fault.

The adjustable amount determination unit 20 is configured to determine an active power adjustable amount of the wind farm based on active power adjustable amounts of each of wind turbines in the wind farm.

The adjustment amount determination unit 30 is configured to determine an active power adjustment amount of each of the wind turbines based on the active power increment to be adjusted in the wind farm and the active power adjustable amount of the wind farm, so as to adjust active power of each of the wind turbines.

Here, the active power adjustable amount of the wind turbine includes at least one of the following: a pitch increasable active power amount indicating an amount of the active power that is increasable by pitch activity, a pitch diminishable active power amount indicating an amount of the active power that is diminishable by pitch activity, a rotor kinetic energy increasable active power amount indicating an amount of the active power that is increasable by changing rotor kinetic energy, and a brake resistor diminishable active power amount indicating an amount of the active power that is diminishable by brake resistor.

In an embodiment, in a case that the active power increment to be adjusted in the wind farm is greater than 0, the adjustable amount determination unit 20 may be configured to: determine a pitch increasable active power amount and a rotor kinetic energy increasable active power amount of each of the wind turbines; determine a pitch increasable active power amount of the wind farm based on the pitch increasable active power amount of each of the wind turbines; and determine a rotor kinetic energy increasable active power amount of the wind farm based on the rotor kinetic energy increasable active power amount of each of the wind turbines.

In an embodiment, in a case that the active power increment to be adjusted in the wind farm is less than 0, the adjustable amount determination unit 20 may be configured to: determine a pitch diminishable active power amount and a brake resistor diminishable active power amount of each of the wind turbines; determine a pitch diminishable active power amount of the wind farm based on the pitch diminishable active power amount of each of the wind turbines; and determine a brake resistor diminishable active power amount of the wind farm based on the brake resistor diminishable active power amount of each of the wind turbines.

In an example, the adjustment amount determination unit 30 is configured to: in a case that the active power increment to be adjusted in the wind farm is greater than 0 and not greater than the pitch increasable active power amount of the wind farm, determine an amount of the active power of each of the wind turbines to be increased by pitch activity based on the active power increment to be adjusted in the wind farm and the pitch increasable active power amount of the wind farm; and in a case that the active power increment to be adjusted in the wind farm is greater than the pitch increasable active power amount of the wind farm, determine an amount of the active power of each of the wind turbines to be increased by pitch activity and an amount of the active power of each of the wind turbines to be increased by changing rotor kinetic energy based on the active power increment to be adjusted in the wind farm, the pitch increasable active power amount of the wind farm, and the rotor kinetic energy increasable active power amount of the wind farm.

In an example, the adjustment amount determination unit 30 is configured to: in the case that the active power increment to be adjusted in the wind farm is greater than 0 and not greater than the pitch increasable active power amount of the wind farm, determine the amount of the active power of each of the wind turbines to be increased by pitch activity to be a product of the pitch increasable active power amount of the wind turbine and a first pitch ratio coefficient; in the case that the active power increment to be adjusted in the wind farm is greater than the pitch increasable active power amount of the wind farm, determine the amount of the active power of each of the wind turbines to be increased by pitch activity to be a pitch increasable active power amount of the wind turbine, and determine the amount of the active power of each of the wind turbines to be increased by changing rotor kinetic energy to be a product of a rotor kinetic energy increasable active power amount of the wind turbine and a rotor kinetic energy ratio coefficient. The first pitch ratio coefficient is a ratio of the active power increment to be adjusted in the wind farm to the pitch increasable active power amount of the wind farm. The rotor kinetic energy ratio coefficient is a ratio of a difference between the active power increment to be adjusted in the wind farm and the pitch increasable active power amount of the wind farm to a rotor kinetic energy increasable active power amount of the wind farm. In a case that the ratio of the difference between the active power increment to be adjusted in the wind farm and the pitch increasable active power amount of the wind farm to the rotor kinetic energy increasable active power amount of the wind farm is greater than 1, the rotor kinetic energy ratio coefficient is set to 1.

In an example, the adjustment amount determination unit 30 is configured to: in a case that the active power increment to be adjusted in the wind farm is less than 0 and an absolute value of the active power increment to be adjusted in the wind farm is not greater than the brake resistor diminishable active power amount of the wind farm, determine an amount of the active power of each of the wind turbines to be decreased by pitch activity and brake resistor together based on the active power increment to be adjusted in the wind farm and the brake resistor diminishable active power amount of the wind farm; and in a case that the active power increment to be adjusted in the wind farm is less than 0 and an absolute value of the active power increment o be adjusted in the wind farm is greater than the brake resistor diminishable active power amount of the wind farm, and the pitch diminishable active power amount of the wind farm is greater than the brake resistor diminishable active power amount of the wind farm, determine an amount of the active power of each of the wind turbines to be decreased by pitch activity and brake resistor together and an amount of the active power of each of the wind turbines to be decreased by pitch activity only, based on the active power increment to be adjusted in the wind farm, the pitch diminishable active power amount of the wind farm, and the brake resistor diminishable active power amount of the wind farm. 100911

In an example, the adjustment amount determination unit 30 is configured to: in the case that, the active power increment to be adjusted in the wind farm is less than 0 and an absolute value of the active power increment to be adjusted in the wind farm is not greater than the brake resistor diminishable active power amount of the wind farm, determine the amount of the active power of each of the wind turbines to be decreased by pitch activity and brake resistor together to be a product of a brake resistor diminishable active power amount of the wind turbine and a synergy ratio coefficient; and in the case that the active power increment to be adjusted in the wind farm is less than 0 and an absolute value of the active power increment to be adjusted in the wind farm is greater than the brake resistor diminishable active power amount of the wind farm, and the pitch diminishable active power amount of the wind farm is greater than the brake resistor diminishable active power amount of the wind farm, determine the amount of the active power of each of the wind turbines to be decreased by pitch activity and brake resistor together to be a brake resistor diminishable active power amount of the wind turbine, and determine the amount of the active power of each of the wind turbines to be decreased by pitch activity only to be a produce of a second pitch ratio coefficient and a difference between a pitch diminishable active power amount of the wind turbine and a brake resistor diminishable active power amount of the wind turbine. The synergy ratio coefficient is a ratio of an absolute value of the active power increment to be adjusted in the wind farm to the brake resistor diminishable active power amount of the wind farm. The second pitch ratio coefficient is a ratio of a first specific difference to a second specific difference. The first specific difference is a difference between the absolute value of the active power increment to be adjusted in the wind farm and the brake resistor diminishable active power amount of the wind farm. The second specific difference is a difference between the pitch diminishable active power amount of the wind farm and the brake resistor diminishable active power amount of the wind farm. In a case that the ratio of the first specific difference to the second specific difference is greater than 1, the second pitch ratio coefficient is set to 1.

In an example, the adjustable amount determination unit 20 is configured to, for each of the wind turbines, determine a pitch increasable active power amount and a rotor kinetic energy increasable active power amount of the wind turbine based on at least one of the following parameters of the wind turbine: current actual power, minimum power, rated power, minimum power capable of having rotor kinetic energy, current maximum theoretical power, a current actual pitch angle, and a minimum pitch angle.

In an example, the adjustable amount determination unit 20 is configured to, for each of the wind turbines: in a case that the current actual power of the wind turbine is less than the minimum power capable of having rotor kinetic energy of the wind turbine and the minimum power of the wind turbine, determine both the pitch increasable active power amount and the rotor kinetic energy increasable active power amount of the wind turbine to be equal to 0; in a case that the current actual power of the wind turbine is less than the minimum power capable of having rotor kinetic energy of the wind turbine and greater than the minimum power of the wind turbine and the current maximum theoretical power of the wind turbine, determine both the pitch increasable active power amount and the rotor kinetic energy increasable active power amount of the wind turbine to be equal to 0; in a case that the current actual power of the wind turbine is less than the minimum power capable of having rotor kinetic energy of the wind turbine and the current maximum theoretical power of the wind turbine, and is greater than the minimum power of the wind turbine, determine the rotor kinetic energy increasable active power amount of the wind turbine to be equal to 0, and determine the pitch increasable active power amount of the wind turbine to be equal to a difference between the current maximum theoretical power of the wind turbine and the current actual power of the wind turbine; in a case that the current actual power of the wind turbine is greater than the minimum power capable of having rotor kinetic energy of the wind turbine and less than the current maximum theoretical power of the wind turbine, and the current actual pitch angle of the wind turbine is greater than the minimum pitch angle of the wind turbine, determine the rotor kinetic energy increasable active power amount of the wind turbine to be equal to 0, and determine the pitch increasable active power amount of the wind turbine to be equal to a difference between the current maximum theoretical power of the wind turbine and the current actual power of the wind turbine; in a case that the current actual power of the wind turbine is greater than the minimum power capable of having rotor kinetic energy of the wind turbine and the current maximum theoretical power of the wind turbine, and the current actual pitch angle of the wind turbine is greater than the minimum pitch angle of the wind turbine, determine the rotor kinetic energy increasable active power amount of the wind turbine to be equal to the rated power of the wind turbine multiplied by a first preset ratio, and determine the pitch increasable active power amount of the wind turbine to be equal to 0; in a case that the current actual power of the wind turbine is greater than the minimum power capable of having rotor kinetic energy of the wind turbine and the rated power of the wind turbine, and the current actual pitch angle of the wind turbine is less than the minimum pitch angle of the wind turbine, determine both the pitch increasable active power amount and the rotor kinetic energy increasable active power amount of the wind turbine to be equal to 0; and in a case that the current actual power of the wind turbine is greater than the minimum power capable of having rotor kinetic energy of the wind turbine and less than the rated power of the wind turbine, and the current actual pitch angle of the wind turbine is less than the minimum pitch angle of the wind turbine, determine the rotor kinetic energy increasable active power amount of the wind turbine to be equal to a minimum one of the rated power of the wind turbine multiplied by the first preset ratio, and a difference between the rated power of the wind turbine and the current actual power of the wind turbine, and determine the pitch increasable active power amount of the wind turbine to be equal to 0.

In an example, the adjustable amount determination unit 20 is configured to, for each of the wind turbines, determine the pitch diminishable active power amount and the brake resistor diminishable active power amount of the wind turbine based on at least one of the following parameters of the wind turbine: the current actual power, the minimum power, and brake resistor diminishable power capacity.

In an example, the adjustable amount determination unit 20 is configured to, for each of the wind turbines: in a case that the current actual power of the wind turbine is less than the minimum power of the wind turbine, determine both the pitch diminishable active power amount and the brake resistor diminishable active power amount of the wind turbine to be equal to 0; in a case that the current actual power of the wind turbine is greater than the minimum power of the wind turbine, and a difference between the current actual power of the wind turbine and the minimum power of the wind turbine is greater than the brake resistor diminishable power capacity of the wind turbine, determine the pitch diminishable active power amount of the wind turbine to be equal to the difference between the current actual power of the wind turbine and the minimum power of the wind turbine, and determine the brake resistor diminishable active power amount of the wind turbine to be equal to the brake resistor diminishable power capacity of the wind turbine; and in a case that the current actual power of the wind turbine is greater than the minimum power of the wind turbine, and a difference between the current actual power of the wind turbine and the minimum power of the wind turbine is less than the brake resistor diminishable power capacity of the wind turbine, determine the pitch diminishable active power amount of the wind turbine to be equal to the difference between the current actual power of the wind turbine and the minimum power of the wind turbine, and determine the brake resistor diminishable active power amount of the wind turbine to be equal to the difference between the current actual power of the wind turbine and the minimum power of the wind turbine.

In an example, the control device for adjusting active power of a wind farm according to the exemplary embodiment of the present disclosure may further include an adjustment stop control unit (not shown). The adjustment stop control unit is configured to: for each of the wind turbines, start timekeeping from a time instant when increasing the active power of the wind turbine by changing the rotor kinetic energy, and control the wind turbine to stop adjusting the active power if duration of increasing the active power by changing the rotor kinetic energy reaches a first preset time period this time; and/or start timekeeping from a time instant when decreasing the active power of the wind turbine by brake resistor, and control the wind turbine to stop adjusting the active power if duration of decreasing the active power by brake resistor reaches a second preset time period this time.

It should be understood that the processes performed by the control device for adjusting active power of a wind farm according to the exemplary embodiment of the present disclosure have been described in detail with reference to FIGS. 1 to 4, and relevant details are not repeated here.

It should be understood that each unit in the control device for adjusting active power of a wind farm according to the exemplary embodiment of the present disclosure may be implemented as a hardware component and/or a software component. Those skilled in the art can implement the various units by utilizing a field programmable gate array (FPGA) or an application specific integrated circuit (ASIC) based on the processes performed by the defined units.

A computer-readable storage medium storing a computer program is provided according to an exemplary embodiment of the present disclosure. The computer program, when executed by a processor, implements the method for adjusting active power of a wind farm according to the above exemplary embodiment. The computer-readable storage medium is any data storage device that can store data read by a computer system. Examples of the computer-readable storage medium include a read-only memory, a random access memory, a read-only optical disk, a magnetic tape, a floppy disk, an optical data storage device, and carrier wave (such as data transmission through the Internet via a wired or wireless transmission path).

A controller of a wind farm according to an exemplary embodiment of the present disclosure includes a processor (not shown) and a memory (not shown). The memory stores a compute program. The computer program, when executed by a processor, implements the method for adjusting active power of a wind farm according to the above exemplary embodiment.

Although some exemplary embodiments of the present disclosure are shown and described, those skilled in the art should understand that these embodiments may be modified without departing from the principle and spirit of the present disclosure whose scope is defined by the claims and their equivalents.

The invention claimed is:

1. A method for adjusting active power of a wind farm, comprising:
   acquiring a demanded amount of the active power to be adjusted in the wind farm;
   determining a total adjustable amount of the active power of the wind farm based on a plurality of adjustable amounts of the active power respectively associated with a plurality of wind turbines in the wind farm;
   determining a plurality of actual amounts of the active power used to adjust the plurality of wind turbines based on the demanded amount of the active power and the total adjustable amount of the active power of the wind farm; and
   adjusting the active power of the plurality of wind turbines by the plurality of actual amounts, respectively.

2. The method according to claim 1, wherein when the demanded amount of the active power of the wind farm is greater than 0, determining the total adjustable amount of the active power of the wind farm comprises:
   determining a plurality of pitch increasable amounts of the active power associated with the plurality of wind turbines, respectively, wherein each pitch increasable amount of the active power indicates a first amount of the active power that is increasable by pitch activity of a corresponding wind turbine;
   determining a plurality of rotor increasable amounts of the active power associated with the plurality of wind turbines, respectively, wherein each rotor increasable amount of the active power indicates a second amount of the active power that is increasable by changing rotor kinetic energy of the corresponding wind turbine;

determining a total pitch increasable amount of the active power of the wind farm based on the plurality of pitch increasable amounts of the active power associated with the plurality of wind turbines; and determining a total rotor increasable amount of the active power of the wind farm based on the plurality of rotor increasable amounts of the active power associated with plurality of the wind turbines.

3. The method according to claim 1, wherein in when the demanded amount of the active power is less than 0, determining the total adjustable amount of the active power of the wind farm comprises:

determining a plurality of pitch diminishable amounts of the active power associated with the plurality of wind turbines, respectively, wherein each pitch diminishable amount of the active power indicates a third amount of the active power that is diminishable by pitch activity of a corresponding wind turbine;

determining a plurality of resistor diminishable amounts of the active power associated with the plurality of wind turbines, respectively, wherein each resistor diminishable amount of the active power indicates a fourth amount of the active power that is diminishable by brake resistor of the corresponding wind turbine;

determining a total pitch diminishable amount of the active power of the wind farm based on the plurality of pitch diminishable amounts of the active power associated with the plurality of wind turbines; and determining a total resistor diminishable amount of the active power of the wind farm based on the plurality of resistor diminishable amounts of the active power associated with the plurality of wind turbines.

4. The method according to claim 2, wherein determining the plurality of actual amounts of the active power used to adjust the plurality of wind turbines comprises:

when the demanded amount of the active power of the wind farm is not greater than the total pitch increasable amount of the active power of the wind farm, determining the plurality of actual amounts of the active power to be increased by the pitch activity of the plurality of wind turbines, respectively, based on the demanded amount of the active power of the wind farm and the total pitch increasable amount of the active power of the wind farm; or when the demanded amount of the active power of the wind farm is greater than the total pitch increasable amount of the active power of the wind farm, determining a plurality of first actual sub-amounts of the active power to be increased by the pitch activity of the plurality of wind turbines, respectively, and a plurality of second actual sub-amounts of the active power of to be increased by changing the rotor kinetic energy of the plurality of wind turbines, respectively, based on the demanded amount of the active power of the wind farm, the total pitch increasable amount of the active power of the wind farm, and the total rotor increasable amount of the active power of the wind farm.

5. The method according to claim 4, wherein:

when the demanded amount of the active power of the wind farm is not greater than the total pitch increasable amount of the active power of the wind farm, each actual amount of the active power to be increased by the pitch activity of a corresponding wind turbine is determined to be a product of a pitch increasable amount of the active power of the corresponding wind turbine and a first pitch ratio coefficient, wherein the first pitch ratio coefficient is a ratio of the demanded amount of the active power of the wind farm to the total pitch increasable amount of the active power of the wind farm; or when the demanded amount of the active power of the wind farm is greater than the total pitch increasable amount of the active power of the wind farm, each first actual sub-amount of the active power to be increased by the pitch activity of the corresponding wind turbine is determined to be the pitch increasable amount of the active power of the corresponding wind turbine, and each second actual sub-amount of the active power to be increased by changing the rotor kinetic energy of the corresponding wind turbine is determined to be a product of a rotor increasable amount of the active power of the corresponding wind turbine and a rotor ratio coefficient.

6. The method according to claim 3, wherein determining the plurality of actual amounts of the active power used to adjust the plurality of wind turbines comprises:

when an absolute value of the demanded amount of the active power is not greater than the total resistor diminishable amount of the active power, determining the plurality of actual amounts of the active power to be decreased by the pitch activity and the brake resistor together based on the demanded amount of the active power and the total resistor diminishable amount of the active power; or when the absolute value of the demanded amount of the active power is greater than the total resistor diminishable amount of the active power, and the total pitch diminishable amount of the active power is greater than the total resistor diminishable amount of the active power, determining a plurality of third actual sub-amounts of the active power to be decreased by the pitch activity and the brake resistor together and a plurality of fourth actual sub-amounts of the active power to be decreased only by the pitch activity, for the plurality of wind turbines based on the demanded amount of the active power, the total pitch diminishable amount of the active power, and the total resistor diminishable amount of the active power.

7. The method according to claim 6, wherein;

when the absolute value of the demanded amount of the active power is not greater than the total resistor diminishable amount of the active power, each actual amount of the active power to be decreased by the pitch activity and the brake resistor together is determined to be a product of a resistor diminishable amount of the active power of the corresponding wind turbine and a synergy ratio coefficient, wherein the synergy ratio coefficient is a ratio of the absolute value of the demanded amount of the active power to the total resistor diminishable amount of the active power; or when the absolute value of the demanded amount of the active power is greater than the total resistor diminishable amount of the active power, and the total pitch diminishable amount of the active power is greater than the total resistor diminishable amount of the active power, each third actual sub-amount of the active power to be decreased by the pitch activity and the brake resistor together is determined to be the resistor diminishable amount of the active power of the corresponding wind turbine, and each fourth actual sub-amount of the active power to be decreased only by the pitch activity for the corresponding wind turbine is determined to be a produce of a second pitch ratio coefficient and a difference between the total pitch diminishable amount of the active power and the total resistor diminishable amount of the active power.

8. The method according to claim 2, wherein determining the plurality of pitch increasable amounts of the active power and the plurality of rotor increasable amounts of the active power associated with plurality of wind turbines comprises:
for each wind turbine, determining a pitch increasable amount of the active power and a rotor increasable amount of the active power for the corresponding wind turbine based on at least one of current actual power, first minimum power, rated power, second minimum power having rotor kinetic energy, current maximum theoretical power, a current actual pitch angle, or a minimum pitch angle associated with the corresponding wind turbine.

9. The method according to claim 8, wherein determining the pitch increasable amount of the active power and the rotor increasable amount of the active power for the corresponding wind turbine comprises:
when the current actual power of the corresponding wind turbine is less than the second minimum power having the rotor kinetic energy and less than the first minimum power of the corresponding wind turbine, determining both the pitch increasable amount of the active power and the rotor increasable amount of the active power to be equal to 0; or
when the current actual power is less than the second minimum power having the rotor kinetic energy but greater than both the first minimum power and the current maximum theoretical power of the corresponding wind turbine, determining both the pitch increasable amount of the active power and the rotor increasable amount of the active power to be equal to 0; or
when the current actual power is less than both the second minimum power having the rotor kinetic energy and the current maximum theoretical power but greater than the first minimum power of the corresponding wind turbine, determining the rotor increasable amount of the active power to be equal to 0, and determining the pitch increasable amount of the active power to be equal to a difference between the current maximum theoretical power and the current actual power; or
when the current actual power is greater than the second minimum power having the rotor kinetic energy but less than the current maximum theoretical power, and the current actual pitch angle of the corresponding wind turbine is greater than the minimum pitch angle of the corresponding wind turbine, determining the rotor increasable amount of the active power to be equal to 0, and determining the pitch increasable amount of the active power to be equal to the difference between the current maximum theoretical power and the current actual power; or
when the current actual power is greater than both the second minimum power having rotor kinetic energy and the current maximum theoretical power, and the current actual pitch angle is greater than the minimum pitch angle, determining the rotor increasable amount of the active power to be equal to the current maximum theoretical power of the corresponding wind turbine multiplied by a first preset ratio, and determining the pitch increasable amount of the active power to be equal to 0; or
when the current actual power is greater than both the second minimum power having the rotor kinetic energy and the rated power, and the current actual pitch angle is less than the minimum pitch angle, determining both the pitch increasable amount of the active power and the rotor increasable amount of the active power to be equal to 0; or
when the current actual power is greater than the second minimum power having the rotor kinetic energy but less than the rated power, and the current actual pitch angle is less than the minimum pitch angle, determining the rotor increasable amount of the active power to be equal to a minimum of the rated power multiplied by the first preset ratio and the difference between the rated power and the current actual power, and determining the pitch increasable amount of the active power to be equal to 0.

10. The method according to claim 3, wherein determining the plurality of pitch diminishable amounts of the active power and the plurality of resistor diminishable amounts of the active power for the plurality of wind turbines comprises:
for each wind turbine, determining a pitch diminishable amount of the active power and a resistor diminishable amount of the active power based on at least one of current actual power, minimum power, or brake resistor diminishable power capacity associated with the corresponding wind turbine.

11. The method according to claim 10, wherein determining the pitch diminishable amount of the active power amount and the resistor diminishable amount of the active power amount for the corresponding wind turbine comprises:
when the current actual power of the corresponding wind turbine is less than the minimum power of the corresponding wind turbine, determining both the pitch diminishable amount of the active power and the resistor diminishable amount of the active power to be equal to 0; or
when the current actual power is greater than the minimum power, and a difference between the current actual power and the minimum power is greater than the brake resistor diminishable power capacity of the corresponding wind turbine, determining the pitch diminishable amount of the active power to be equal to the difference between the current actual power and the minimum power, and determining the resistor diminishable amount of the active power to be equal to the brake resistor diminishable power capacity; or
when the current actual power of is greater than the minimum power, and the difference between the current actual power and the minimum power is less than the brake resistor diminishable power capacity, determining the pitch diminishable amount of the active power to be equal to the difference between the current actual power and the minimum power, and determining the resistor diminishable amount of the active power to be equal to the difference between the current actual power and the minimum power.

12. The method according to claim 4, further comprising:
for each wind turbine, starting timekeeping from a first time instant when increasing the active power of the corresponding wind turbine by changing the rotor kinetic energy, and controlling the corresponding wind turbine to stop adjusting the active power if a first duration of increasing the active power by changing the rotor kinetic energy reaches a first preset time period; or starting timekeeping from a second time instant when decreasing the active power of the corresponding wind turbine by the brake resistor, and controlling the corresponding wind turbine to stop adjusting the active power if a second duration of decreasing the active power by the brake resistor reaches a second preset time period.

13. The method according to claim 1, wherein the demanded amount of the active power is acquired when the wind farm performs primary frequency modulation, when the wind farm performs secondary frequency modulation, or when at least one of the wind farm or a power grid connected to the wind farm has a fault.

14. A non-transitory computer-readable storage medium storing a computer program, wherein the computer program, when executed by a processor, causes the processor to perform operations comprising:
acquiring a demanded amount of the active power to be adjusted in the wind farm;
determining a total adjustable amount of the active power of the wind farm based on a plurality of adjustable amounts of the active power respectively associated with a plurality of wind turbines in the wind farm;
determining a plurality of actual amounts of the active power used to adjust the plurality of wind turbines based on the demanded amount of the active power and the total adjustable amount of the active power of the wind farm; and
adjusting the active power of the plurality of wind turbines by the plurality of actual amounts, respectively.

15. A controller of a wind farm, comprising:
a processor; and
a memory configured to store a computer program that, when executed by the processor, causes the processor to perform operations comprising:
acquiring a demanded amount of the active power to be adjusted in the wind farm;
determining a total adjustable amount of the active power of the wind farm based on a plurality of adjustable amounts of the active power respectively associated with a plurality of wind turbines in the wind farm; and
determining a plurality of actual amounts of the active power used to adjust the plurality of wind turbines based on the demanded amount of the active power and the total adjustable amount of the active power of the wind farm; and
adjusting the active power of the plurality of wind turbines by the plurality of actual amounts, respectively.

16. The method according to claim 5, further comprising:
determining an amount difference between the demanded amount of the active power of the wind farm and the total pitch increasable amount of the active power of the wind farm; and
determining the rotor ratio coefficient to be a ratio of the amount difference to the total rotor increasable amount of the active power of the wind farm.

17. The method according to claim 5, further comprising:
determining an amount difference between the demanded amount of the active power of the wind farm and the total pitch increasable amount of the active power of the wind farm;
determining a ratio of the amount difference to the total rotor increasable amount of the active power of the wind farm; and
determining the rotor ratio coefficient to be 1 when the ratio is greater than 1.

18. The method according to claim 7, further comprising
determining a first difference between the absolute value of the demanded amount of the active power and the total resistor diminishable amount of the active power;
determining a second difference between the total pitch diminishable amount of the active power and the total resistor diminishable amount of the active power; and
determining the second pitch ratio coefficient to be a ratio of the first difference to the second difference.

19. The method according to claim 7, further comprising:
determining a first difference between the absolute value of the demanded amount of the active power and the total resistor diminishable amount of the active power;
determining a second difference between the total pitch diminishable amount of the active power and the total resistor diminishable amount of the active power;
determining a ratio of the first difference to the second difference; and
determining the second pitch ratio coefficient to be 1 when the ratio of the first difference to the second difference is greater than 1.

* * * * *